US012149003B2

(12) United States Patent
Sun et al.

(10) Patent No.: US 12,149,003 B2
(45) Date of Patent: Nov. 19, 2024

(54) ANTENNA MODULE AND ELECTRONIC DEVICE

(71) Applicant: WISTRON NEWEB CORPORATION, Hsinchu (TW)

(72) Inventors: Tzu-Kuan Sun, Hsinchu (TW); Pao-Chuan Peng, Hsinchu (TW); Meng-Kai Wu, Hsinchu (TW); Hong-Jun Jian, Hsinchu (TW)

(73) Assignee: WISTRON NEWEB CORPORATION, Hsinchu (TW)

( * ) Notice: Subject to any disclaimer, the term of this patent is extended or adjusted under 35 U.S.C. 154(b) by 139 days.

(21) Appl. No.: 18/189,249

(22) Filed: Mar. 24, 2023

(65) Prior Publication Data

US 2024/0128642 A1 Apr. 18, 2024

(30) Foreign Application Priority Data

Oct. 14, 2022 (TW) ................................ 111138969

(51) Int. Cl.
*H01Q 3/22* (2006.01)
*H01Q 3/24* (2006.01)
*H01Q 1/22* (2006.01)

(52) U.S. Cl.
CPC ................ *H01Q 3/24* (2013.01); *H01Q 3/22* (2013.01); *H01Q 1/2291* (2013.01)

(58) Field of Classification Search
CPC .... H01Q 1/243; H01Q 1/2266; H01Q 1/2291; H01Q 3/22; H01Q 3/24; H01Q 5/328; H01Q 5/371; H01Q 5/385; H01Q 5/392; H01Q 9/42
See application file for complete search history.

(56) References Cited

U.S. PATENT DOCUMENTS

| | | | | |
|---|---|---|---|---|
| 7,289,071 B2 * | 10/2007 | Hung | H01Q 5/40 343/702 |
| 7,791,546 B2 * | 9/2010 | Hotta | H01Q 5/378 343/702 |
| 9,281,565 B2 * | 3/2016 | Chiu | H01Q 9/16 |
| 9,620,857 B2 | 4/2017 | Chen et al. | |
| 9,905,912 B2 * | 2/2018 | Wu | H01Q 9/42 |
| 11,133,605 B2 | 9/2021 | Wei | |
| 2009/0237308 A1 * | 9/2009 | Tsai | H01Q 5/378 343/700 MS |

(Continued)

FOREIGN PATENT DOCUMENTS

| | | |
|---|---|---|
| TW | 201526391 A | 7/2015 |
| TW | M533332 U | 12/2016 |

*Primary Examiner* — Tung X Le
(74) *Attorney, Agent, or Firm* — McClure, Qualey & Rodack, LLP

(57) ABSTRACT

An antenna module and an electronic device are provided. The antenna module is disposed in a housing of the electronic device. The antenna module includes a first radiating element, a second radiating element, a grounding element, and a switching circuit. The first radiating element includes a first radiating portion and a second radiating portion that are connected with each other. The second radiating element includes a third radiating portion, a fourth radiating portion, a fifth radiating portion, and a feeding portion. The switching circuit is electrically connected between the grounding element and the first radiating element or between the grounding element and the feeding portion.

16 Claims, 6 Drawing Sheets

(56) References Cited

U.S. PATENT DOCUMENTS

| | | | | |
|---|---|---|---|---|
| 2010/0328164 | A1 | 12/2010 | Huynh | |
| 2015/0029071 | A1* | 1/2015 | Hwang | H01Q 5/35<br>343/845 |
| 2015/0145744 | A1* | 5/2015 | Kao | H01Q 9/42<br>343/852 |

* cited by examiner

ANTENNA MODULE AND ELECTRONIC DEVICE

CROSS-REFERENCE TO RELATED PATENT APPLICATION

This application claims the benefit of priority to Taiwan Patent Application No. 111138969, filed on Oct. 14, 2022. The entire content of the above identified application is incorporated herein by reference.

Some references, which may include patents, patent applications and various publications, may be cited and discussed in the description of this disclosure. The citation and/or discussion of such references is provided merely to clarify the description of the present disclosure and is not an admission that any such reference is "prior art" to the disclosure described herein. All references cited and discussed in this specification are incorporated herein by reference in their entireties and to the same extent as if each reference was individually incorporated by reference.

FIELD OF THE DISCLOSURE

The present disclosure relates to an antenna module and an electronic device, and more particularly to an antenna module and an electronic device capable of covering multiple frequency bands.

BACKGROUND OF THE DISCLOSURE

With the development of mobile communication technology, exterior designs of electronic devices (such as notebook computers or tablet computers) are developed toward being thinner and more lightweight, and screen frames of these electronic devices are gradually reduced in size. Therefore, an internal space of the electronic device that can be used for placement of an antenna is very limited. In response to demand for narrow screen frames, the size of an existing antenna structure also needs to be reduced. However, reduction in the size of the antenna structure will result in a substantial decrease in bandwidth.

Therefore, how to design an antenna structure capable of simultaneously transmitting and receiving multiple frequency bands and having good antenna efficiency within the limited internal space of the electronic device has become an important issue to be addressed in the related art.

SUMMARY OF THE DISCLOSURE

In response to the above-referenced technical inadequacy, the present disclosure provides an antenna module and an electronic device, which can address an issue of the antenna module not having a sufficient bandwidth due to miniaturization requirements of the electronic device.

In order to solve the above-mentioned problem, one of the technical aspects adopted by the present disclosure is to provide an antenna module, which includes a first radiating element, a second radiating element, a grounding element, and a switching circuit. The first radiating element includes a first radiating portion and a second radiating portion that are connected with each other. The second radiating element includes a third radiating portion, a fourth radiating portion, a fifth radiating portion, and a feeding portion. The feeding portion is connected between the third radiating portion, the fourth radiating portion, and the fifth radiating portion. The feeding portion is connected to a feeding element. The third radiating portion is positioned between the first radiating portion and the fourth radiating portion. The third radiating portion extends along a first direction relative to the feeding portion, the fifth radiating portion extends along a second direction relative to the feeding portion, and the first direction is different from the second direction. The switching circuit is electrically connected between the grounding element and the first radiating element or between the grounding element and the feeding portion. The switching circuit is configured to be switched to a first mode and a second mode. When the switching circuit is switched to the first mode, the first radiating portion and the third radiating portion are used to generate a first operating frequency band. When the switching circuit is switched to the second mode, the first radiating portion and the third radiating portion are used to generate a second operating frequency band. A central frequency of the first operating frequency band is higher than a central frequency of the second operating frequency band.

In order to solve the above-mentioned problem, another one of the technical aspects adopted by the present disclosure is to provide an electronic device, which includes a housing and an antenna module disposed in the housing. The antenna module includes a first radiating element, a second radiating element, a grounding element, and a switching circuit. The first radiating element includes a first radiating portion and a second radiating portion that are connected with each other. The second radiating element includes a third radiating portion, a fourth radiating portion, a fifth radiating portion, and a feeding portion. The feeding portion is connected between the third radiating portion, the fourth radiating portion, and the fifth radiating portion. The feeding portion is connected to a feeding element. The third radiating portion is positioned between the first radiating portion and the fourth radiating portion. The third radiating portion extends along a first direction relative to the feeding portion, the fifth radiating portion extends along a second direction relative to the feeding portion, and the first direction is different from the second direction. The switching circuit is electrically connected between the grounding element and the first radiating element or between the grounding element and the feeding portion. The switching circuit is configured to be switched to a first mode and a second mode. When the switching circuit is switched to the first mode, the first radiating portion and the third radiating portion are used to generate a first operating frequency band. When the switching circuit is switched to the second mode, the first radiating portion and the third radiating portion are used to generate a second operating frequency band. A central frequency of the first operating frequency band is higher than a central frequency of the second operating frequency band.

Therefore, in the antenna module and the electronic device provided by the present disclosure, by virtue of "the switching circuit being configured to be switched to a first mode and a second mode," "in response to the switching circuit being switched to the first mode, the first radiating portion and the third radiating portion being used to generate a first operating frequency band, and in response to the switching circuit being switched to the second mode, the first radiating portion and the third radiating portion being used to generate a second operating frequency band," and "a central frequency of the first operating frequency band being higher than a central frequency of the second operating frequency band," the electronic device and the antenna module thereof can satisfy requirements of multiple frequency bands despite being miniaturized.

These and other aspects of the present disclosure will become apparent from the following description of the embodiment taken in conjunction with the following drawings and their captions, although variations and modifications therein may be affected without departing from the spirit and scope of the novel concepts of the disclosure.

BRIEF DESCRIPTION OF THE DRAWINGS

The described embodiments may be better understood by reference to the following description and the accompanying drawings, in which.

DETAILED DESCRIPTION OF THE EXEMPLARY EMBODIMENTS

Figure 1:
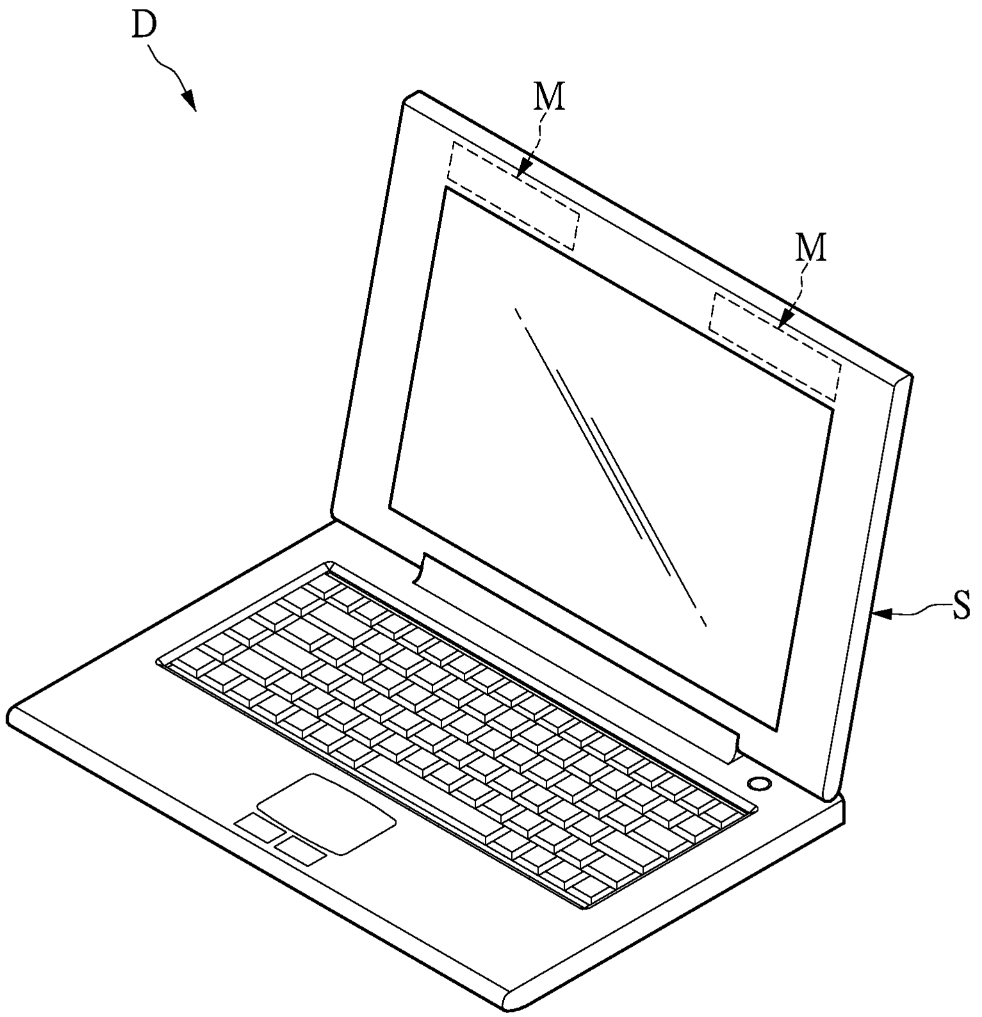
FIG. 1 is a schematic perspective view of an electronic device according to the present disclosure.

The present disclosure is more particularly described in the following examples that are intended as illustrative only since numerous modifications and variations therein will be apparent to those skilled in the art. Like numbers in the drawings indicate like components throughout the views. As used in the description herein and throughout the claims that follow, unless the context clearly dictates otherwise, the meaning of "a," "an" and "the" includes plural reference, and the meaning of "in" includes "in" and "on." Titles or subtitles can be used herein for the convenience of a reader, which shall have no influence on the scope of the present disclosure.

The terms used herein generally have their ordinary meanings in the art. In the case of conflict, the present document, including any definitions given herein, will prevail. The same thing can be expressed in more than one way. Alternative language and synonyms can be used for any term(s) discussed herein, and no special significance is to be placed upon whether a term is elaborated or discussed herein. A recital of one or more synonyms does not exclude the use of other synonyms. The use of examples anywhere in this specification including examples of any terms is illustrative only, and in no way limits the scope and meaning of the present disclosure or of any exemplified term. Likewise, the present disclosure is not limited to various embodiments given herein. Numbering terms such as "first," "second" or "third" can be used to describe various components, signals or the like, which are for distinguishing one component/signal from another one only, and are not intended to, nor should be construed to impose any substantive limitations on the components, signals or the like.

In addition, the term "connect" or "connected" in the context of the present disclosure means that there is a physical connection between two elements, and the two elements are directly or indirectly connected. The term "couple" or "coupled" in the context of the present disclosure means that two elements are separate from each other and have no physical connection therebetween, and an electric field energy generated by one of the two elements excites an electric field energy generated by another one of the two elements.

EMBODIMENTS

Referring to FIG. 1, the present disclosure provides an electronic device D capable of transmitting and receiving wireless radio frequency signals. For example, the electronic device D can be a smart phone, a tablet computer or a notebook computer. In the present disclosure, the electronic device D is exemplified as the notebook computer. However, the present disclosure is not limited thereto. The electronic device D includes an antenna module M and a housing S (one part of the housing S can be made of metal). The antenna module M is disposed in the housing S and located at a screen frame of the electronic device D. As shown in FIG. 1, a quantity of the antenna module M included in the electronic device D is two, but the present disclosure is not limited thereto.

Figure 2:
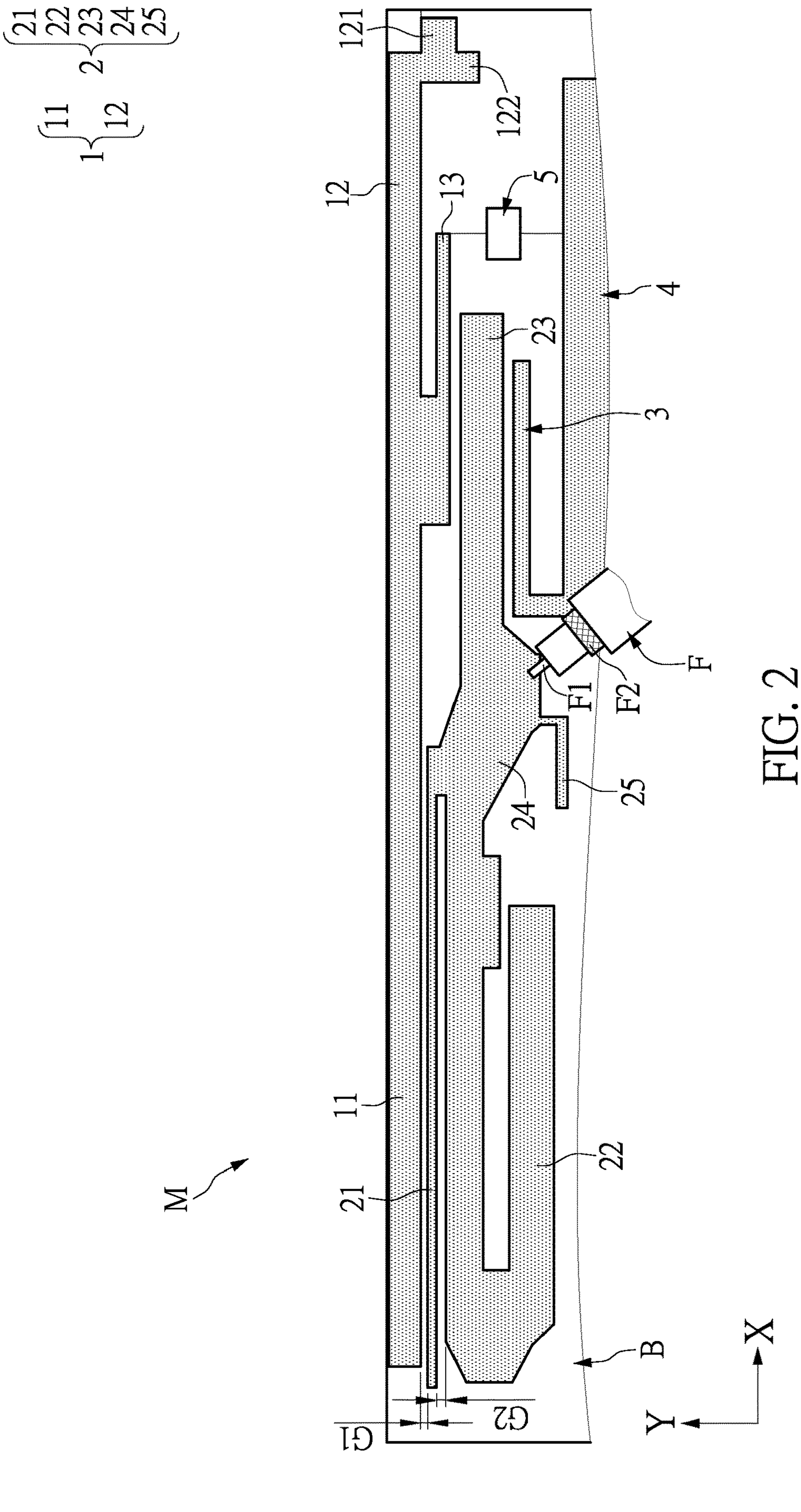
FIG. 2 is a schematic perspective view of an antenna module according to a first embodiment of the present disclosure.

Referring to FIG. 2, FIG. 2 is a schematic perspective view of an antenna module according to a first embodiment of the present disclosure. The antenna module M is disposed on a carrier B. The antenna module M includes a first radiating element 1, a second radiating element 2, a third radiating element 3, a grounding element 4, and a switching circuit 5. The first radiating element 1 includes a first radiating portion 11, a second radiating portion 12, and an extension portion 13 connected therebetween. The switching circuit 5 is electrically connected between the grounding element 4 and the first radiating element 1. Specifically, one end of the switching circuit 5 is electrically connected to the grounding element 4, and another end of the switching circuit 5 is electrically connected to the extension portion 13. The third radiating element 3 is connected to the grounding element 4.

The second radiating element 2 includes a third radiating portion 21, a fourth radiating portion 22, a fifth radiating portion 23, and a feeding portion 24. The feeding portion 24 is connected between the third radiating portion 21, the fourth radiating portion 22, and the fifth radiating portion 23. The third radiating portion 21 is positioned between the first radiating portion 11 and the fourth radiating portion 22. The third radiating portion 21 extends along a first direction relative to the feeding portion 24. The fifth radiating portion 23 extends along a second direction relative to the feeding portion 24. The first direction is different from the second direction. For example, the first direction is a negative X-axis direction, and the second direction is a positive X-axis direction, but the present disclosure is not limited thereto. The feeding portion 24 is connected to a feeding element F. The feeding element F has a feeding end F1 and a grounding end F2. The feeding element F is electrically connected to the feeding portion 24 through the feeding end F1, and is electrically connected to the grounding element 4 through the grounding end F2. Therefore, the feeding portion 24 is used to feed a signal to the second radiating element 2 by connecting to the feeding element F.

Reference is further made to FIG. 2. The second radiating element 2 further includes a sixth radiating portion 25 connected to the feeding portion 24. The sixth radiating portion 25 and the third radiating element 3 are substantially formed to have an L shape. The sixth radiating portion 25 extends along the negative X-axis direction, and the third radiating element 3 extends along the positive X-axis direction, but the present disclosure is not limited thereto. Frequency bands generated by the antenna module M of the present disclosure can be divided into frequency bands having a fixed frequency range and frequency bands having an adjustable frequency range, which will be further described below.

The first radiating portion 11 and the third radiating portion 21 are spaced apart from each other by a first coupling gap G1 that ranges from 0.1 mm to 2 mm. Moreover, the first radiating portion 11 and the third radiating portion 21 are spaced apart from each other and coupled with each other, and an adjustable frequency range from 617 MHz to 940 MHz can be generated through a switching mechanism of the switching circuit 5. The third radiating portion 21 and the fourth radiating portion 22 are spaced apart from each other by a second coupling gap G2 that ranges from 0.3 mm to 3 mm. The fourth radiating portion 22 is used to be excited for generating a fixed frequency range from 900 MHz to 960 MHz.

The third radiating portion 21 is excited to generate a fixed frequency range from 1,420 MHz to 1,450 MHz. The first radiating portion 11 and the fifth radiating portion 23 are spaced apart from each other and coupled with each other, and an adjustable frequency range from 1,450 MHz to 2,250 MHz can be generated through the switching mechanism of the switching circuit 5.

The second radiating portion 12 is excited, and adjustable frequency ranges from 1,800 MHz to 2,500 MHz and from 3,300 MHz to 3,800 MHz can be generated through the switching mechanism of the switching circuit 5. Furthermore, as shown in FIG. 2, the fifth radiating portion 13 includes a first branch 121 and a second branch 122. The first branch 121 extends along the second direction, the second branch 122 extends along a third direction, and the second direction is different from the third direction. For example, the second direction is the positive X-axis direction, and the third direction is a negative Y-axis direction, but the present disclosure is not limited thereto. In the first embodiment, the double-branch structure of the second radiating portion 12 can be used to increase a bandwidth of the antenna module M and increase an antenna gain.

The third radiating element 3 and the fifth radiating portion 23 are spaced apart from each other and coupled with each other for generating fixed frequency ranges from 2,400 MHz to 2,690 MHz and from 4,000 MHz to 5,000 MHz. The sixth radiating portion 25 is excited to generate a fixed frequency range from 5,150 MHz to 5,925 MHz.

Figure 3:
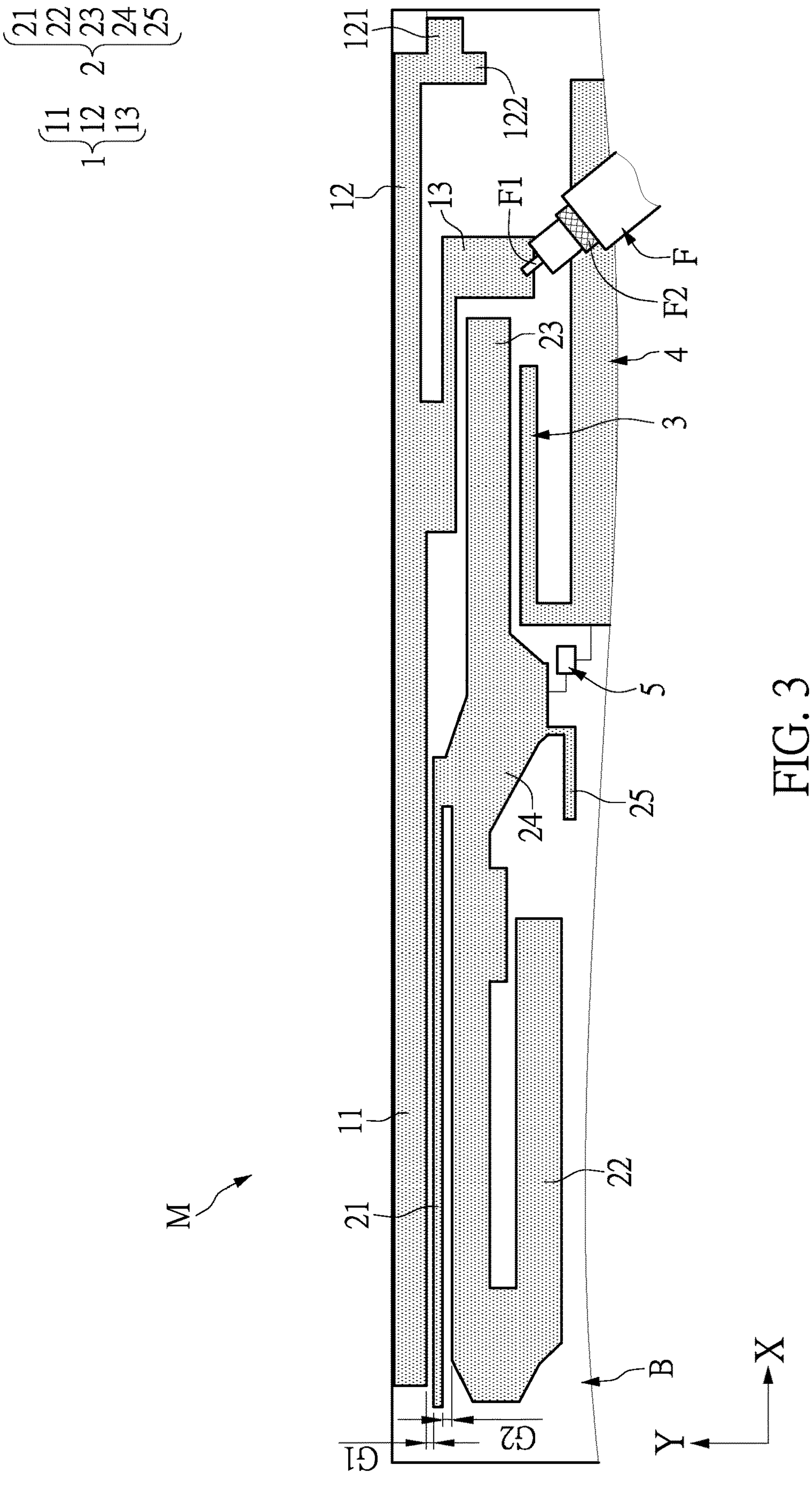
FIG. 3 is a schematic perspective view of the antenna module according to a second embodiment of the present disclosure.

Referring to FIG. 3, FIG. 3 is a schematic perspective view of the antenna module according to a second embodiment of the present disclosure. The main difference between FIG. 2 and FIG. 3 resides in that locations of the feeding element F and the switching circuit 5 of the antenna module M are different. In the second embodiment, the switching circuit 5 is electrically connected between the grounding element 4 and the feeding portion 24 of the second radiating element 2, and the feeding element F is electrically connected between the grounding element 4 and the extension portion 13 of the first radiating element 1. As shown in FIGS. 2 and 3, by reversing the locations of the feeding element F and the switching circuit 5, the antenna module M can still generate different frequency ranges that cover low, intermediate and high frequency bands.

Figure 5:
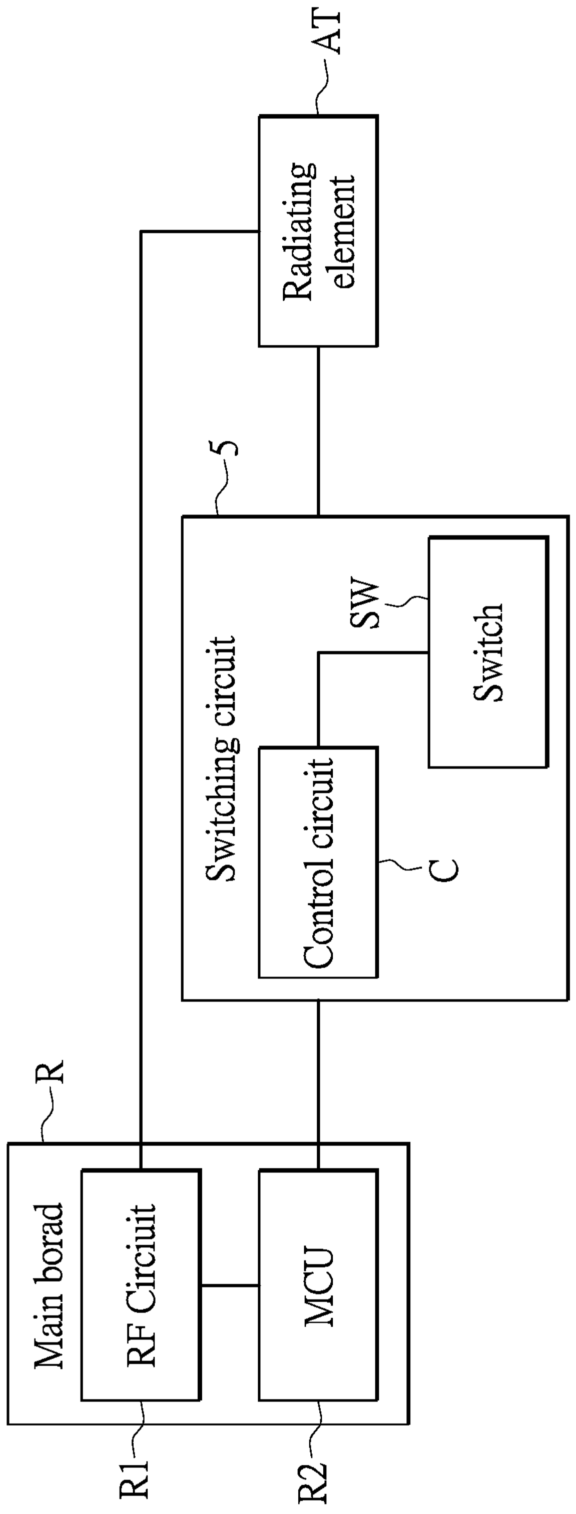
FIG. 5 is a functional block diagram showing an inside of the electronic device according to the present disclosure.

Referring to FIG. 5, FIG. 5 is a functional block diagram showing an inside of the electronic device according to the present disclosure. Inside the electronic device D (as shown in FIG. 1), the switching circuit 5 of the antenna module M mainly includes a control circuit C and at least one switch SW. The control circuit C is electrically connected to the at least one switch SW. The switching circuit 5 is electrically connected to a main board R. The main board R includes a radio frequency circuit (RF circuit) R1 and a microcontroller (MCU) R2, and the RF circuit R1 is electrically connected to the microcontroller R2. Moreover, the microcontroller R2 is electrically connected to the switching circuit 5, and the RF circuit R1 is electrically connected to a radiating element AT in the antenna module M through a feeding line (i.e., the feeding element F). It should be noted that, since the switching circuit 5 can be electrically connected to the first radiating element 1 or the second radiating element 2, the radiating element AT can be the first radiating element 1 or the second radiating element 2. When the switching circuit 5 is electrically connected to the first radiating element 1, the radiating element AT is the first radiating element 1. When the switching circuit 5 is electrically connected to the second radiating element 2, the radiating element AT is the second radiating element 2. The RF circuit R1 can directly transmit a signal to the radiating element AT through the feeding line. Alternatively, the microcontroller R2 can transmit a control signal to the switching circuit 5. In this way, the control circuit C controls the at least one switch SW to generate different switching mechanisms, thereby generating the required frequency range.

Figure 4:
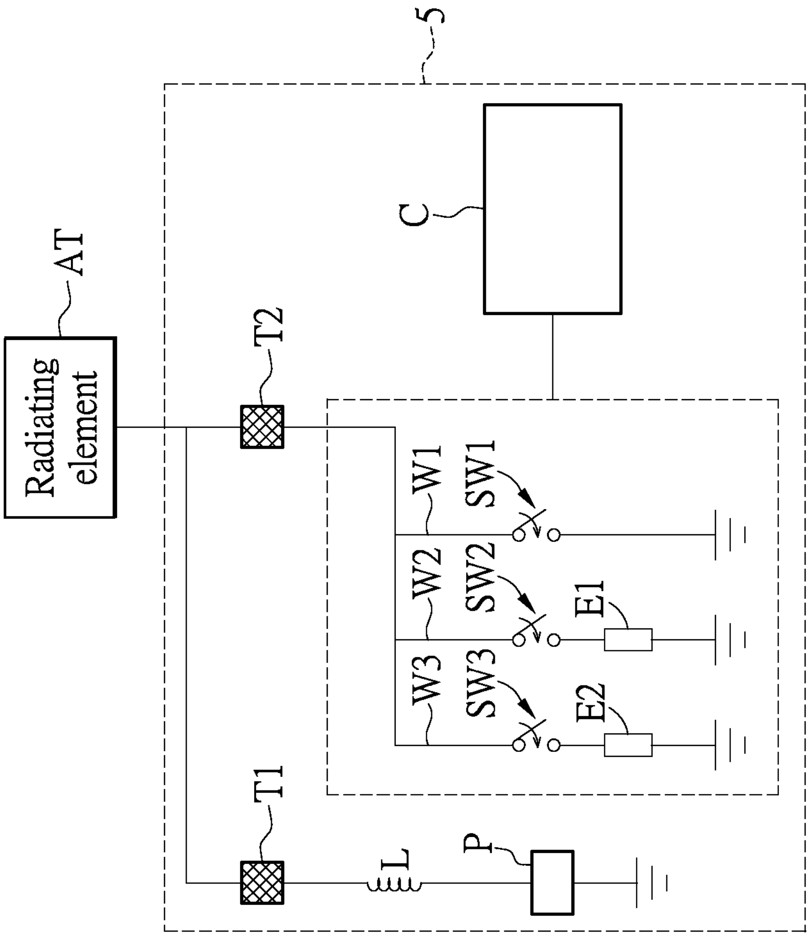
FIG. 4 is a schematic perspective view of a switching circuit of the antenna module according to the present disclosure.

Then, referring to FIG. 4, FIG. 4 is a schematic perspective view of a switching circuit of the antenna module according to the present disclosure. According to the placement of the switching circuit 5, the radiating element AT can be the first radiating element 1 or the second radiating element 2. The radiating element AT is electrically connected to one pin T2 of the switching circuit 5, and then is electrically connected to multiple paths (e.g., a first path W1, a second path W2, and a third path W3 in FIG. 4) through the pin T2. In the embodiments of the present disclosure, the switching circuit 5 includes multiple switches, such as a first switch SW1, a second switch SW2, and a third switch SW3 in FIG. 4. The control circuit C can control states (a conducting state or a non-conducting state) of these switches and switch the switching circuit 5 to a first mode and a second mode. The first mode refers to all of the switches being in the non-conducting state or at least one of the switches being in the conducting state. The second mode also refers to all of the switches being in the non-conducting state or at least one of the switches being in the conducting state. However, it should be noted that equivalent impedances generated by the switching circuit 5 in the first mode and the second mode are different from one another. The greater the equivalent impedance generated by the switching circuit is, the higher the operating frequency band generated by the antenna module M is.

For example, the switching circuit 5 includes the first path W1, the second path W2, and the third path W3. The first path W1 includes the first switch SW1, the second path W2 includes the second switch SW2 and a first passive element E1, and the third path W3 includes the third switch SW3 and a second passive element E2. The control circuit C controls the state (the non-conducting state or the conducting state) of the first switch SW1 to switch the switching circuit 5 to the first mode or the second mode, and controls the states (the non-conducting state or the conducting state) of the second switch SW2 and the third switch SW3 to switch the switching circuit 5 to a third mode and a fourth mode. In addition, in the embodiments of the present disclosure, the first passive element E1 and the second passive element E2 are capacitors, a capacitance of the first passive element E1 is 1.45 pF, and a capacitance of the second passive element E2 is 6.42 pF. However, types of the first passive element E1 and the second passive element E2 are not limited in the present disclosure. In another embodiment, the first passive element E1 and the second passive element E2 can be inductors or resistors.

Figure 6:
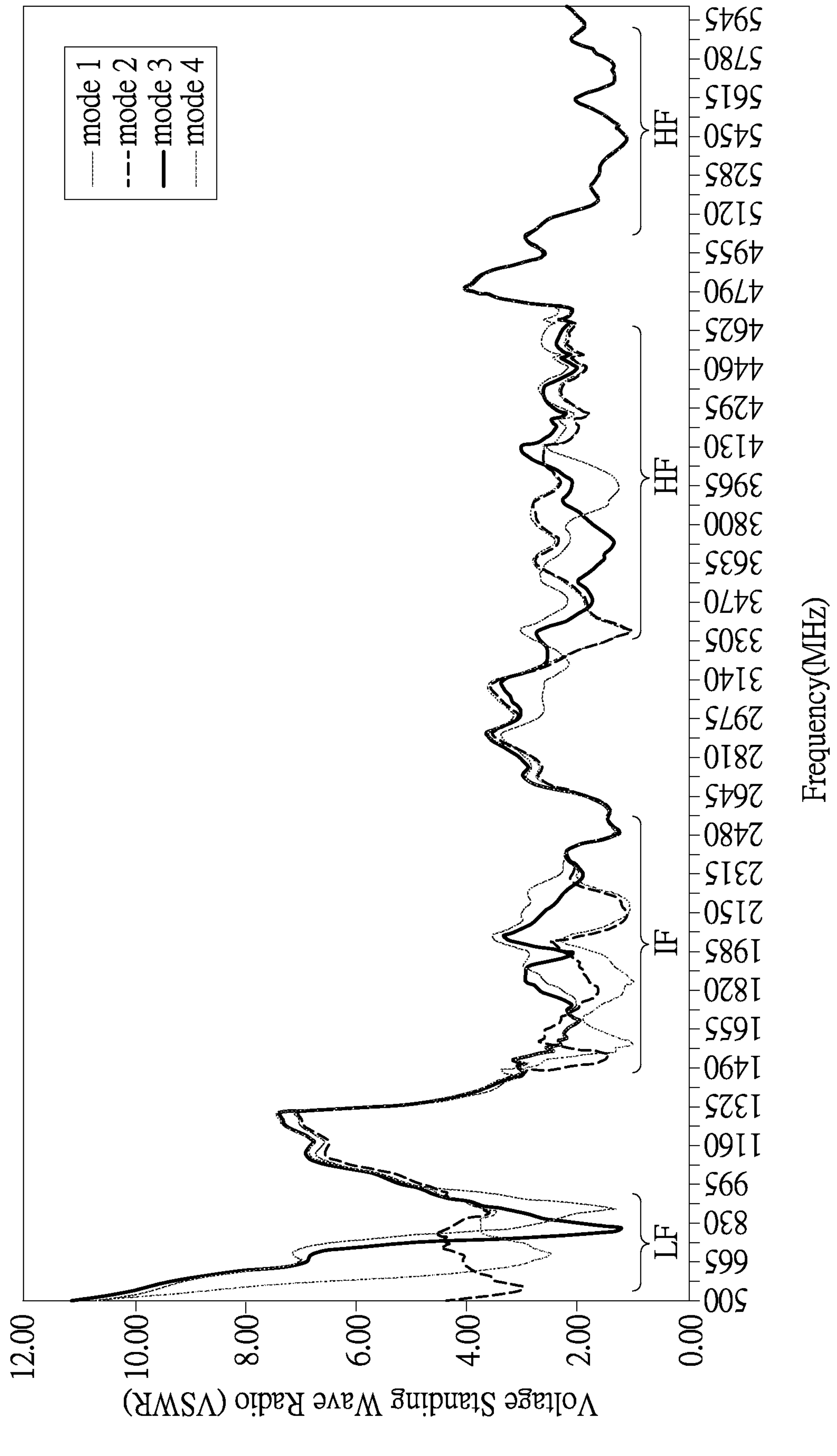
FIG. 6 is a curve diagram showing a voltage standing wave ratio of the antenna module when passing different paths according to the present disclosure.

Referring to FIG. 4 and FIG. 6, FIG. 6 is a curve diagram showing a voltage standing wave ratio of the antenna module when passing different paths according to the present disclosure. Bandwidths of low frequency and intermediate frequency generated by the antenna module M can be adjusted through the switching mechanism of the switching circuit 5.

When the switching circuit 5 is switched to the first mode (mode 1), the first switch SW1, the second switch SW2, and the third switch SW3 are in the non-conducting state. When the switching circuit 5 is switched to the second mode (mode 2), the first switch SW1 is in the conducting state, and the second switch SW2 and the third switch SW3 are in the non-conducting state. Accordingly, the equivalent impedance generated by the switching circuit 5 in the first mode is greater than the equivalent impedance generated by the switching circuit 5 in the second mode. Furthermore, when the switching circuit 5 is switched to the first mode (mode 1), the first radiating portion 11 and the third radiating portion 21 are coupled with each other for generating a first operating frequency band. When the switching circuit 5 is switched to the second mode (mode 2), the first radiating portion 11 and the third radiating portion 21 are coupled with each other for generating a second operating frequency band. The first operating frequency band and the second operating frequency band are both covered in a low frequency range from 617 MHz to 940 MHz. Due to the equivalent impedance generated by the switching circuit 5 in the first mode being greater than the equivalent impedance generated by the switching circuit 5 in the second mode, a central frequency of the first operating frequency band is higher than a central frequency of the second operating frequency band.

Moreover, when the switching circuit 5 is switched to the first mode (mode 1), the first radiating portion 11 and the fifth radiating portion 23 are coupled with each other for generating a third operating frequency band. When the switching circuit 5 is switched to the second mode (mode 2), the first radiating portion 11 and the fifth radiating portion 23 are coupled with each other for generating a fourth operating frequency band. The third operating frequency band and the fourth operating frequency band are both covered in an intermediate frequency range from 1,450 MHz to 2,250 MHz. A central frequency of the third operating frequency band is higher than a central frequency of the fourth operating frequency band, and the central frequency of the third operating frequency band and the central frequency of the fourth operating frequency band are higher than the central frequency of the first operating frequency band.

Reference is further made to FIGS. 4 and 6. The switching circuit 5 is further switched to the third mode and the fourth mode. When the switching circuit 5 is switched to the third mode (mode 3), the second switch SW2 is in the conducting state, the first switch SW1 and the third switch SW3 are in the non-conducting state, and the first radiating portion 11 and the third radiating portion 21 are coupled with each other for generating a fifth operating frequency band. When the switching circuit 5 is switched to the fourth mode (mode 4), the third switch SW3 is in the conducting state, the first switch SW1 and the second switch SW2 are in the non-conducting state, and the first radiating portion 11 and the third radiating portion 21 are coupled with each other for generating a sixth operating frequency band. The fifth operating frequency band and the sixth operating frequency band are both covered in the low frequency range from 617 MHz to 940 MHz. A central frequency of the fifth operating frequency band and a central frequency of the sixth operating frequency band are different from one another, and the central frequency of the fifth operating frequency band and the central frequency of the sixth operating frequency band are in-between the central frequency of the first operating frequency band and the central frequency of the second operating frequency band.

Similarly, when the switching circuit 5 is switched to the third mode (mode 3), the first radiating portion 11 and the fifth radiating portion 23 are coupled with each other for generating a seventh operating frequency band. When the switching circuit 5 is switched to the fourth mode (mode 4), the first radiating portion 11 and the fifth radiating portion 23 are coupled with each other for generating an eighth operating frequency band. The seventh operating frequency band and the eighth operating frequency band are both covered in the intermediate frequency range from 1,450 MHz to 2,250 MHz. A central frequency of the seventh operating frequency band and a central frequency of the eighth operating frequency band are different from one another, and the central frequency of the seventh operating frequency band and the central frequency of the eighth operating frequency band are in-between the central frequency of the third operating frequency band and the central frequency of the fourth operating frequency band.

In addition, bandwidths of high frequency generated by the antenna module M can also be adjusted through the switching mechanism of the switching circuit 5. When the switching circuit 5 is switched to the first mode (mode 1), the second radiating portion 12 is excited to generate a ninth operating frequency band. When the switching circuit 5 is switched to the second mode (mode 2), the second radiating portion 12 is excited to generate a tenth operating frequency band. The ninth operating frequency band and the tenth operating frequency band are both covered in a high frequency range from 1,800 MHz to 2,500 MHz and from 3,300 MHz to 3,800 MHz, and a central frequency of the ninth operating frequency band is higher than a central frequency of the tenth operating frequency band.

Similarly, when the switching circuit 5 is switched to the third mode (mode 3), the second radiating portion 12 is excited to generate an eleventh operating frequency band. When the switching circuit 5 is switched to the fourth mode (mode 4), the second radiating portion 12 is excited to generate a twelfth operating frequency band. The eleventh operating frequency band and the twelfth operating frequency band are both covered in the high frequency range from 1,800 MHz to 2,500 MHz and from 3,300 MHz to 3,800 MHz. A central frequency of the eleventh operating frequency band and a central frequency of the twelfth operating frequency band are different from one another, and the central frequency of the eleventh operating frequency band and the central frequency of the twelfth operating frequency band are in-between the central frequency of the ninth operating frequency band and the central frequency of the tenth operating frequency band.

Therefore, by switching different modes to control the states of the first switch SW1, the second switch SW2, and the third switch SW3 of the switching circuit 5, an electric current in the switching circuit 5 can pass through different paths (the first path W1, the second path W2, and the third path W3), such that the central frequency of the operating frequency bands in low, intermediate, and high frequency ranges generated by the antenna module M can be adjusted to achieve an increase in bandwidth.

The switching circuit 5 is also applicable to an implementation in which multiple switches are in the conducting state. For example, in the low frequency range, the switching circuit 5 is configured to be switched to a fifth mode. When the switching circuit 5 is switched to the fifth mode, at least two of the first switch SW1, the second switch SW2, and the third switch SW3 are in the conducting state. A central frequency of an operating frequency band generated by the first radiating portion 11 and the third radiating portion 21 in the fifth mode is in-between the central frequency of the first operating frequency band and the central frequency of the second operating frequency band, and is different from the central frequency of the fifth operating frequency band and the central frequency of the sixth operating frequency band.

Reference is further made to FIG. 4. The antenna module M further includes a proximity sensing circuit P and an inductor L. The radiating element AT is electrically connected to another pin T1 of the switching circuit 5, and then is electrically connected to the proximity sensing circuit P through the pin T1. The inductor L is connected between the radiating element AT and the proximity sensing circuit P in series, so as to prevent interference between an antenna structure (i.e., the first radiating element 1, the second radiating element 2, and the third radiating element 3) and the proximity sensing circuit P. Through the configuration of the proximity sensing circuit P, the Radiating element AT (which can be the first radiating element 1 or the second radiating element 2 according to location of the switching circuit 5) serves as a sensor electrode (a sensor pad), such that the proximity sensing circuit P can be used to sense a distance between an object (such as body parts of a user) and the antenna module M. Accordingly, the electronic device D is able to sense whether or not a human body is adjacent to the antenna module M, so as to adjust a radiation power of the antenna module M. In this way, a specific absorption rate (SAR) at which electromagnetic wave energy is absorbed per unit mass by an organism can be prevented from being exceedingly high. In the embodiment of the present disclosure, the proximity sensing circuit P and the inductor L are disposed in the switching circuit 5. However, in another embodiment, the proximity sensing circuit P and the inductor L can also be disposed on the main board R (as shown in FIG. 5).

Beneficial Effects of the Embodiments

In conclusion, in the antenna module and the electronic device provided by the present disclosure, by virtue of "the switching circuit being configured to be switched to a first mode and a second mode," "in response to the switching circuit being switched to the first mode, the first radiating portion and the third radiating portion being used to generate a first operating frequency band, and in response to the switching circuit being switched to the second mode, the first radiating portion and the third radiating portion being used to generate a second operating frequency band," and "a central frequency of the first operating frequency band being higher than a central frequency of the second operating frequency band, the electronic device and the antenna module thereof can satisfy requirements of multiple frequency bands despite being miniaturized.

Moreover, in the related art, due to limitation of an internal space of the electronic device that can be used for placement of an antenna (especially when the size of the antenna structure as shown in FIG. 2 or FIG. 3 is further reduced in the Y-axis), the existing antenna structure cannot satisfy the required bandwidth specification. Therefore, in the present disclosure, the antenna structure (the first radiating element 1, the second radiating element 2, and the third radiating element 3) is added with the switching circuit 5 to form the antenna module M, and the antenna module M can control the states of the first switch SW1, the second switch SW2, and the third switch SW3 through switching different modes of the switching circuit 5, such that the electric current in the switching circuit 5 can pass through different paths (the first path W1, the second path W2, and the third path W3). In this way, the central frequency of the operating frequency bands in the low, intermediate, and high frequency ranges generated by the antenna module M can be adjusted, and an effect of increasing the bandwidth can be further achieved through cooperation with the frequency bands that have the fixed frequency range and generated by the antenna structure.

The foregoing description of the exemplary embodiments of the disclosure has been presented only for the purposes of illustration and description and is not intended to be exhaustive or to limit the disclosure to the precise forms disclosed. Many modifications and variations are possible in light of the above teaching.

The embodiments were chosen and described in order to explain the principles of the disclosure and their practical application so as to enable others skilled in the art to utilize the disclosure and various embodiments and with various modifications as are suited to the particular use contemplated. Alternative embodiments will become apparent to those skilled in the art to which the present disclosure pertains without departing from its spirit and scope.

What is claimed is:

1. An antenna module, comprising:

a first radiating element, wherein the first radiating element includes a first radiating portion and a second radiating portion that are connected with each other;

a second radiating element, wherein the second radiating element includes a third radiating portion, a fourth radiating portion, a fifth radiating portion, and a feeding portion, the feeding portion is connected between the third radiating portion, the fourth radiating portion, and the fifth radiating portion, the feeding portion is connected to a feeding element, the third radiating portion is positioned between the first radiating portion and the fourth radiating portion, the third radiating portion extends along a first direction relative to the feeding portion, the fifth radiating portion extends along a second direction relative to the feeding portion, and the first direction is different from the second direction;

a grounding element; and a switching circuit, wherein the switching circuit is electrically connected between the grounding element and the first radiating element or between the grounding element and the feeding portion;

wherein the switching circuit is configured to be switched to a first mode and a second mode; wherein, in response to the switching circuit being switched to the first mode, the first radiating portion and the third radiating portion are coupled with each other for generating a first operating frequency band, and in response to the switching circuit being switched to the second mode, the first radiating portion and the third radiating portion are coupled with each other for generating a second operating frequency band; wherein a central frequency of the first operating frequency band is higher than a central frequency of the second operating frequency band.

2. The antenna module according to claim 1, wherein, in response to the switching circuit being switched to the first mode, the first radiating portion and the fifth radiating portion are coupled with each other for generating a third operating frequency band, and in response to the switching circuit being switched to the second mode, the first radiating portion and the fifth radiating portion are coupled with each other for generating a fourth operating frequency band; wherein a central frequency of the third operating frequency band is higher than a central frequency of the fourth operating frequency band, and the central frequency of the third operating frequency and the central frequency of the fourth operating frequency band are higher than the central frequency of the first operating frequency band.

3. The antenna module according to claim 1, further comprising a third radiating element, wherein the second radiating element further includes a sixth radiating portion, the third radiating element is connected to the grounding element, and the sixth radiating portion is connected to the feeding portion.

4. The antenna module according to claim 1, wherein the first radiating portion and the third radiating portion are spaced apart from each other by a first coupling gap that ranges from 0.1 mm to 2 mm, and the third radiating portion and the fourth radiating portion are spaced apart from each other by a second coupling gap that ranges from 0.3 mm to 3 mm.

5. The antenna module according to claim 1, wherein the second radiating portion includes a first branch and a second branch, the first branch extends along the second direction, the second branch extends along a third direction, and the second direction is different from the third direction.

6. The antenna module according to claim 1, wherein the switching circuit includes a first path, the first path includes a first switch, the first mode refers to the first switch being in a non-conducting state, and the second mode refers to the first switch being in a conducting state.

7. The antenna module according to claim 6, wherein the switching circuit further includes a second path and a third path, the second path includes a second switch and a first passive element, and the third path includes a third switch and a second passive element; wherein the switching circuit is further configured to be switched to a third mode and a fourth mode, the third mode refers to the second switch being in the conducting state, and the fourth mode refers to the third switch being in the conducting state; wherein, in response to the switching circuit being switched to the third mode, the first radiating portion and the third radiating portion are coupled with each other for generating a fifth operating frequency band, and in response to the switching circuit being switched to the fourth mode, the first radiating portion and the third radiating portion are coupled with each other for generating a sixth operating frequency band; wherein a central frequency of the fifth operating frequency band is different from a central frequency of the sixth operating frequency band.

8. The antenna module according to claim 7, wherein the switching circuit is further configured to be switched to a fifth mode; wherein, in response to the switching circuit being switched to the fifth mode, at least two of the first switch, the second switch, and the third switch are in the conducting state, and a central frequency of an operating frequency band generated from the first radiating portion and the third radiating portion in the fifth mode is different from the central frequency of the fifth operating frequency band and the central frequency of the sixth operating frequency band.

9. An electronic device, comprising:

a housing; and an antenna module disposed in the housing, wherein the antenna module includes:

a first radiating element, wherein the first radiating element includes a first radiating portion and a second radiating portion that are connected with each other;

a second radiating element, wherein the second radiating element includes a third radiating portion, a fourth radiating portion, a fifth radiating portion, and a feeding portion, the feeding portion is connected between the third radiating portion, the fourth radiating portion, and the fifth radiating portion, the feeding portion is connected to a feeding element, the third radiating portion is positioned between the first radiating portion and the fourth radiating portion, the third radiating portion extends along a first direction relative to the feeding portion, the fifth radiating portion extends along a second direction relative to the feeding portion, and the first direction is different from the second direction;

a grounding element; and a switching circuit, wherein the switching circuit is electrically connected between the grounding element and the first radiating element or between the grounding element and the feeding portion;

wherein the switching circuit is configured to be switched to a first mode and a second mode; wherein, in response to the switching circuit being switched to the first mode, the first radiating portion and the third radiating portion are coupled with each other for generating a first operating frequency band, and in response to the switching circuit being switched to the second mode, the first radiating portion and the third radiating portion are coupled with each other for generating a second operating frequency band; wherein a central frequency of the first operating frequency band is higher than a central frequency of the second operating frequency band.

10. The electronic device according to claim 9, wherein, in response to the switching circuit being switched to the first mode, the first radiating portion and the fifth radiating portion are coupled with each other for generating a third operating frequency band, and in response to the switching circuit being switched to the second mode, the first radiating portion and the fifth radiating portion are coupled with each other for generating a fourth operating frequency band; wherein a central frequency of the third operating frequency band is higher than a central frequency of the fourth operating frequency band, and the central frequency of the third operating frequency and the central frequency of the fourth operating frequency band are higher than the central frequency of the first operating frequency band.

11. The electronic device according to claim 9, further comprising a third radiating element, wherein the second radiating element further includes a sixth radiating portion, the third radiating element is connected to the grounding element, and the sixth radiating portion is connected to the feeding portion.

12. The electronic device according to claim 9, wherein the first radiating portion and the third radiating portion are spaced apart from each other by a first coupling gap that ranges from 0.1 mm to 2 mm, and the third radiating portion and the fourth radiating portion are spaced apart from each other by a second coupling gap that ranges from 0.3 mm to 3 mm.

13. The electronic device according to claim 9, wherein the second radiating portion includes a first branch and a second branch, the first branch extends along the second direction, the second branch extends along a third direction, and the second direction is different from the third direction.

14. The electronic device according to claim 9, wherein the switching circuit includes a first path, the first path includes a first switch, the first mode refers to the first switch being in a non-conducting state, and the second mode refers to the first switch being in a conducting state.

15. The electronic device according to claim 14, wherein the switching circuit further includes a second path and a third path, the second path includes a second switch and a first passive element, and the third path includes a third switch and a second passive element; wherein the switching circuit is further configured to be switched to a third mode and a fourth mode, the third mode refers to the second switch being in the conducting state, and the fourth mode refers to the third switch being in the conducting state; wherein, in response to the switching circuit being switched to the third mode, the first radiating portion and the third radiating portion are coupled with each other for generating a fifth operating frequency band, and in response to the switching circuit being switched to the fourth mode, the first radiating portion and the third radiating portion are coupled with each other for generating a sixth operating frequency band; wherein a central frequency of the fifth operating frequency band is different from a central frequency of the sixth operating frequency band.

16. The electronic device according to claim 15, wherein the switching circuit is further configured to be switched to a fifth mode; wherein, in response to the switching circuit being switched to the fifth mode, at least two of the first switch, the second switch, and the third switch are in the conducting state, and a central frequency of an operating frequency band generated from the first radiating portion and the third radiating portion in the fifth mode is different from the central frequency of the fifth operating frequency band and the central frequency of the sixth operating frequency band.

* * * * *